Aug. 1, 1972   W. JONES   3,681,173
HEAT SEALING OF THERMOPLASTIC FILMS
Filed April 13, 1970   2 Sheets-Sheet 1

INVENTOR.
Wickliffe Jones
BY
Wood, Herron and Evans
ATTORNEYS

Aug. 1, 1972   W. JONES   3,681,173
HEAT SEALING OF THERMOPLASTIC FILMS
Filed April 13, 1970   2 Sheets-Sheet 2

INVENTOR
Wickliffe Jones
BY Wood, Herron & Evans
ATTORNEYS sure to the cylinder directly with the speed of the machine. This apparatus further includes mechanism for moving the wheel completely away from the film upon stoppage of the machine and to return the wheel gradually to the film upon restarting the machine.

United States Patent Office 3,681,173
Patented Aug. 1, 1972

3,681,173
HEAT SEALING OF THERMOPLASTIC FILMS
Wickliffe Jones, Cincinnati, Ohio, assignor to R. A. Jones & Company, Inc., Covington, Ky.
Filed Apr. 13, 1970, Ser. No. 27,918
Int. Cl. B32b 31/20, 31/02
U.S. Cl. 156—555    8 Claims

ABSTRACT OF THE DISCLOSURE

A heat sealing wheel presses a continuously moving film against a back-up surface, the pressure of the wheel on the film being varied directly with the speed of the film.

BACKGROUND OF THE INVENTION

Figure 1:
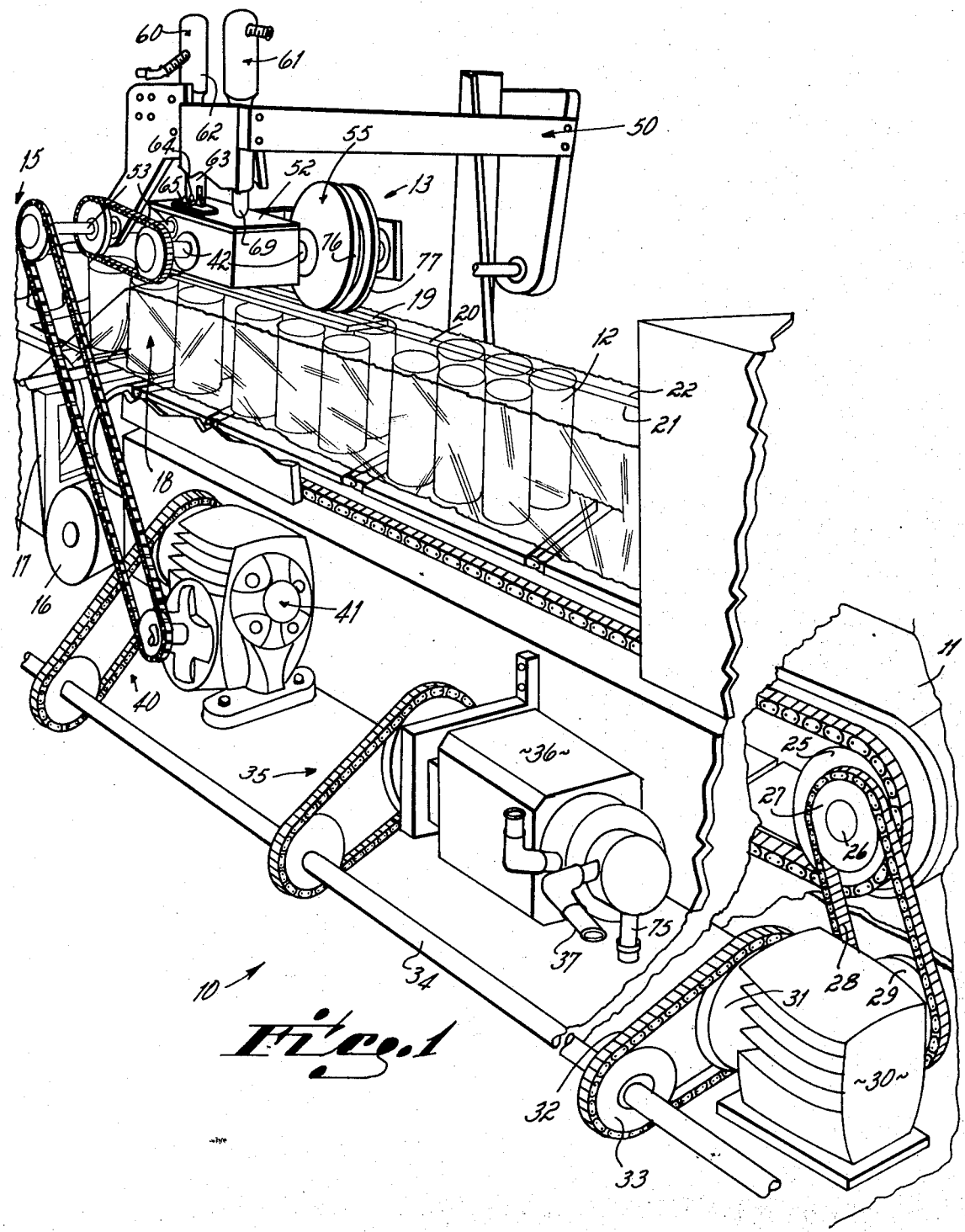

This invention relates to the sealing of a continuously moving thermoplastic film and is particularly directed to apparatus for wrapping articles in a film in a constant motion packaging machine.

In the art of sealing thermoplastic films, it is common to effect sealing in static situations, that is, situations where the sealing parameters such as time and temperature do not vary. In one situation a sealing element engages a fixed film for a predetermined interval of time. In another situation, a sealing element engages continuously moving film but that film always moves at the same rate of speed past the sealing element and thus, the sealing conditions remain static. In these situations, it is no difficult problem to determine the proper temperature of the sealing element where the time of exposure of the film to the sealing element is known.

The present invention is directed to the solution of a more difficult problem namely, that of sealing a continuously moving film in which the rate of speed of the film may be changed from time to time. While the basic concept of the invention has wide application, the concept and the apparatus for giving effect to the concept can perhaps be best understood by relating the concept to a specific problem at hand, namely that of forming a web of film into a tube wrapped about continuously moving articles, the free edges of the film being lapped and sealed to form the tube. Apparatus of this type is disclosed in the Greenwell application Ser. No. 787,844, filed Dec. 30, 1968 where, in the preferred embodiment, groups of six cans are wrapped in film to form a six-pack package. For a variety of reasons, that packaging machine might be run quite slowly to package less than 100 six-packs per minute or it might be run very rapidly to package more than 200 six-packs per minute. Thus, the ratio of speeds to which the sealer must accomodate itself is greater than 2:1.

The apparatus for sealing the lapped edges of the film must be capable of coping with these wide variations in speed and it has been an objective of the invention to provide such apparatus. This objective of the invention has been achieved by providing apparatus wherein the film is sandwiched between a heated sealing element and a back-up surface, the apparatus including means for varying the pressure of the sealing element on the film directly with the machine speed. Thus, it is possible to maintain constant, the temperature of the sealing wheel and to accomodate the variations in machine speed, and hence film speed, by varying the pressure at which the heat, via the wheel, is applied to the film.

It has been another objective of the invention to provide, in apparatus of the type described above, a mechanism for varying the pressure of the sealing wheel including a pneumatic piston and cylinder for applying the pressure to the wheel and means for varying the air pressure to the cylinder directly with the speed of the machine. This apparatus further includes mechanism for moving the wheel completely away from the film upon stoppage of the machine and to return the wheel gradually to the film upon restarting the machine.

Another objective of the invention has been to provide a heated wheel as the sealing element and, as the back-up surface, at least one small resilient roller. The sealing wheel, having a hard hot rim can depress the resilient roller slightly and distribute the pressure over a larger area than would be possible with a hard back-up surface. Therefore, the use of a resilient roller minimizes the tendency to thin down the seal to the point of weakening it.

More specifically, it is preferred to cradle the rim of the sealing wheel between two spaced resilient rollers thereby further increasing the interval of pressure contact between the sealing wheel and the film from almost instant contact to contact over the arc of film between the two rollers.

In one application of this feature of the invention, two parallel seals are formed by a sealing wheel having two spaced rims, each rim being cradled between two rollers. The downstream rollers are on a first axle and the upstream rollers are on a second axle, the axles being tiltable relative to one another thereby permitting the apparatus to accomodate possible irregularities in the sealing wheel and its support, thereby providing assurance that the pressures of the wheel rim on each roller will be equal.

Another objective of the invention has been to provide a mechanism for releasing and applying the sealing wheel to the film, the mechanism being coordinated with the means for starting and stopping the packaging machine, so that no packages are lost due to burn through or failure to seal.

Figure 2:
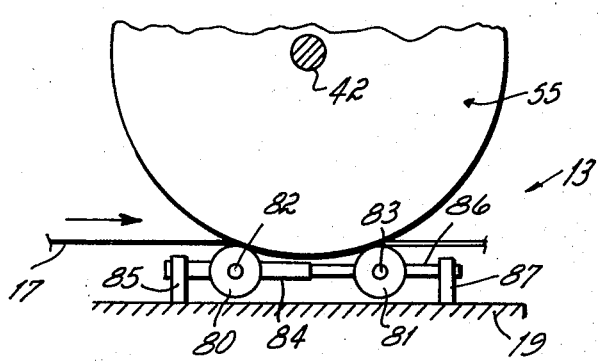
Figure 3:
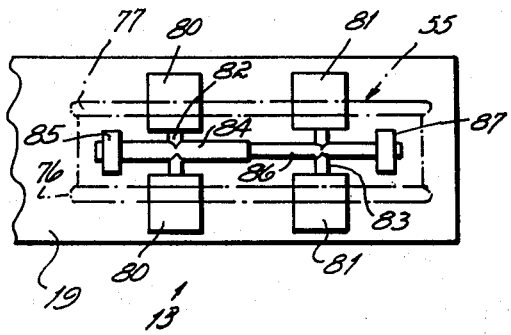
Figure 4:
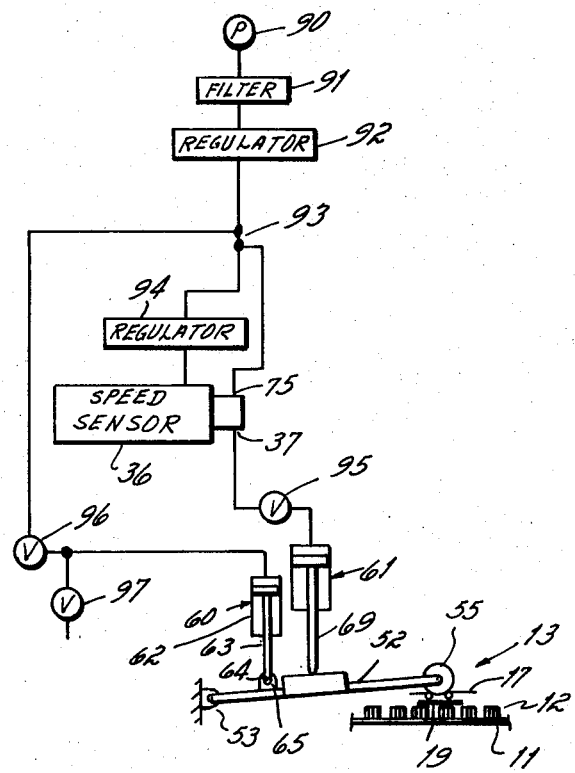

The several features and objectives of the invention will become more readily apparent from the following detailed description taken in conjunction with the accompanying drawings in which:

FIG. 1 is a perspective view of a portion of packaging apparatus employing the sealer of the present invention, FIG. 2 is a side elevational view of the heat sealing wheel and back-up roller, FIG. 3 is a plan view of the back-up rollers, and FIG. 4 is a diagram of the pneumatic system.

The packaging machine generally

Apparatus with which the present invention is useful is indicated at 10 in FIG. 1. The apparatus for wrapping cans into a six-pack includes an endless conveyor 11 carrying a group of six cans 12 past a sealing station 13 where the present invention is employed.

The cans 12 are first metered into groups of six by a metering mechanism not shown but located generally as indicated at 15. Between the metering section and the conveyor 11 is a supply 16 of film 17 and a former 18 including a horizontal mandrel 19 overlying the conveyor 11 and under which the articles pass. The film is supplied as a flat web, but as it passes over the former 18, it is wrapped about the cans 12 in the form of an elongated tube, the film having its edges overlapped as at 20 over mandrel 19. The overlapped edges of the film are sealed along parallel seals 21 and 22 by the sealing apparatus 13 which will be described below.

The sealing apparatus is driven in synchronism with the conveyor 11 through a suitable drive mechanism. For example, the downstream end of the conveyor 11 passes about a sprocket 25 fixed to a shaft 26, that shaft carries a sprocket 27 driving a chain 28 connected to an input sprocket 29 on a gear box 30. The gear box 30 has an output sprocket 31 which is connected by a chain 32 to a sprocket 33 which drives a shaft 34.

Shaft 34 is connected by a sprocket and chain system 35 to a speed sensor 36 whose function is to provide a pressure at an outlet port 37 which is proportional to the speed with which the sensor is driven, that sensor being driven directly from the conveyor shaft 26.

The heat sealing apparatus is also driven from the shaft 34 through the sprocket and chain connection 40 passing through gear box 41 to drive a shaft 42 on the heat sealing apparatus.

The heat sealing apparatus

The heat sealing apparatus includes a frame 50 having depending plates on each side of the conveyor 11 to which a lever arm 52 is pivoted on an axis 53 at the upstream end of the arm. The downstream end of the arm carries the shaft 42 which, as described above, is driven directly from the conveyor 11. A sealing wheel 55 is mounted on the shaft 42. The diameter of the wheel 55 is so related to the speed with which the shaft 42 carrying it is driven that its peripheral speed is identical to the lineal speed with which the film 17 is pulled past the mandrel 19.

Because the shaft 42 is mounted downstream of the pivot axis 53 of the arm 52, the wheel 55 can be swung toward and away from the film as the conditions of operation require. The control of the position of the wheel 55 is effected by a lifting piston and cylinder 60 and by a pressure applying diaphragm cylinder 61. The piston and cylinder 60 has a cylinder 62 mounted on the frame 50 and a piston rod 63 pivoted at 64 to a bracket 65 fixed to the arm 52, the pivot axis being downstream of the pivot axis 53 of the arm 52 so that when a lifting force is applied to the piston rod 63, the arm 52 will be swung counterclockwise as viewed in FIG. 1 to lift the sealing wheel away from the mandrel 19.

The diaphragm cylinder 61 has a rod 69 bearing against the arm 52. When air under pressure is applied to the diaphragm air cylinder 61, the arm 69 is driven downwardly to force the sealing wheel 55 against the film. The pressure which is applied by the rod 69 against the arm 52 and consequently, the wheel 55 varies directly with the speed of the film which is, of course, dependent upon the speed of the machine including the conveyor shaft 26.

There may be a variety of mechanisms by which the pressure of the sealing wheel against the film may be varied directly with the speed of the machine or film. In the illustrated form of the invention, that relationship is attained through the use of the speed sensor 36. The element 36 is a Rotational Speed Sensor, manufactured by Wabco (Westinghouse Air Brake Company). In its operation, high pressure air is supplied to a port 75. The mechanism within the sensor is driven at a speed proportional to the machine speed and creates an output pressure at the port 37 which is proportional to the machine speed. The port 37 is connected directly to the cylinder 61 so that the pressure in the cylinder 61 is directly proportional to the machine speed, and hence the force of the piston rod 69 on the arm 52 and hence the force of the sealing wheel 55 on the film is proportional to machine speed.

The wheel 55 is energized to heat it through a suitable electrical circuit and commutator rings not shown. To form the parallel seals, the wheel has parallel rims 76 and 77. These rims are hard and may press the film directly against the mandrel 19 with satisfactory results. However, it is preferred to employ as a back-up surface for the film, the resilient rollers of FIGS. 2 and 3. As best shown in FIG. 2, each rim is cradled between an upstream roller 80 and a downstream roller 81. The upstream rollers are mounted on a common shaft 82 and the downstream rollers are mounted on a common shaft 83. The shaft 82 is mounted on a tube 84, journalled on a bracket 85 and the shaft 83 is mounted on a rod 86 journalled on a bracket 87, the rod 86 being telescoped inside the tube 84. Thus, the respective shafts 82 and 83 may be tilted with respect to one another thereby enabling the resilient rollers 80 and 81 mounted thereon to tilt with respect to each other to equalize the pressure on the rollers and thereby to apply uniform pressure to the parallel seals.

The sealing wheel is large compared to the rollers 80 and 81. For example, the sealing wheel is slightly over 5 inches in diameter and the rollers ¾ inch in diameter. The rollers are resilient or at least have a surface covering such as rubber, of substantial thickness which is resilient. Thus, when the sealing wheel is pressed against the rollers, the rims press into the rollers thereby creating a substantial surface contact between sealing wheel and roller which provides a substantial time interval of application of heat to the film at the pressure areas.

The pneumatic system

The pneumatic system is illustrated in FIG. 4 and includes an air supply 90 under a pressure of 90–100 p.s.i., for example. The supply is connected through a filter 91, a regulator 92 to maintain a constant 80 p.s.i. pressure at its output to a joint 93. The air supply is divided at that joint 93, a first leg being connected to the lift piston and cylinder 60, a second leg being connected through a regulator 94 having a 10 p.s.i. output to the speed sensor 36. A third leg is connected to the input port 75 of the speed sensor. The output side 37 of the speed sensor 36 is connected, as described above, through a solenoid operated valve 95 to the diaphragm air cylinder 61.

The cylinder 60 is connected through a solenoid operated valve 96 to the air supply so that actuation of the valve 96 causes air to be admitted to the cylinder 60 to lift the arm 52 and hence the sealing wheel 55. The valve 96 is operated by a speed switch, not shown, which energizes the solenoid as the machine has slowed almost to a stop. The operation is such that the conveyor 11 will have only approximately an inch of travel (less than half the distance between rollers 80, 81) after the solenoid has been energized. The line to the cylinder 60 is also connected to a solenoid operated bleeder valve 97. When the sealing apparatus is to be operated, the bleeder valve is opened, the valve 96 is closed so that when pressure is applied to the arm 52, it will swing slowly toward the film under the pressure applied by the rod 69 while air from the cylinder 60 is bled through the valve 97. The relationships are such that the conveyor 11 moves about an inch (less than half the distance between rollers) before full pressure contact of the sealing wheel to the film is made.

By way of example, the film being sealed is a 1.25 mil polyethylene. The sealing wheel has a 1,000 watt input and is maintained at a constant temperature of 410° F. The packages which are on 10.5 inch centers, may move past the sealing wheel at a speed determined by the operator which may be below 100 packages per minute to above 200 packages per minute. Again by way of example, at 200 packages per minute the pressure on the axle of the sealing wheel would be sixty pounds, however, at 100 packages per minute, the pressure on the axle of the sealing wheel would be thirty pounds.

In the operation of the invention, the film is fed over the former 18 and has its edges overlapped to form a tube within which the articles are carried. The overlapped edges of the film pass between the sealing wheel 55 and the mandrel 19. Preferably, the film is pressed against the rubber covered rollers 80 and 81 which are mounted on the mandrel 19. A pressure is applied to the arm supporting the sealing wheel 55 to force the sealing wheel against the film. The pressure applied to the sealing wheel is directly proportional to the speed of the machine whereby a satisfactory seal, without burning through the film, is formed whether the machine is running at a rate of 200 packages per minute or at a slow rate of less than 100 packages per minute.

The use of the speed switch operated valve 96 and the bleeder valve 97 permits the machine to be stopped and restarted without losing a package either from burning through the film or from failure to apply sealing heat to the film. When the machine is to be stopped, the sealing wheel continues to press the film against the rollers until the machine is almost stopped. While the conveyor still has approximately an inch of travel before stopping, the speed switch energizes the solenoid 97 to operate the lift cylinder 60, causing the wheel to move away from the rollers and the film. The film will remain in contact with the sealing wheel during a portion of this movement but in any event, the length of film which is not subjected to full pressure contact is less than the distance between the the distance between the two rollers.

When the machine is started up, the requirement of bleeding fluid from the cylinder 60 through the bleeder valve 97 keeps the wheel out of contact with the film until start-up motion of the conveyor 11 has clearly begun. Full pressure contact is made with the film after the film has travelled approximately an inch, in any event, less than the distance between the two rollers.

In this way, in neither the stop nor start-up conditions is the sealing wheel in contact with stationary film. Further, the length of film not under full pressure contact due to stopping and restarting is less than the distance between the two rollers and hence will be under a full pressure contact by the downstream roller 81 after start-up is effected.

While the invention has been described in relation to the sealing of unsupported films, it is to be understood that its principles are applicable to sealing supported films as well.

I claim:

1. In a machine, means for driving said machine at any of a plurality of speeds, and means for feeding at machine speed, a thermoplastic film requiring a seal, heat sealing apparatus for said film comprising,
 means forming a back-up surface,
 a heated sealing element adjacent said surface,
 said film being fed between said sealing element and said surface,
 means for pressing said sealing element against said film,
 means connected between said driving means and said pressing means for varying the force of said pressing means directly with the speed of said machine.

2. Heat sealing apparatus according to claim 1 in which said heat sealing element is a wheel rotatably mounted adjacent said back-up surface.

3. Heat sealing apparatus according to claim 1 in which said back-up surface forming means comprises a rigid mandrel having a flat surface over which said film passes, said heat sealing element being a wheel rotatably mounted adjacent said mandrel.

4. Heat sealing apparatus according to claim 1 further comprising,
 a lever pivoted on said machine adjacent said back-up surface, said sealing element being mounted on said lever, a cylinder having a pneumatically actuated rod connected between said machine and lever, means for applying fluid pressure to said cylinder to urge said rod and hence said sealing element toward said back-up surface, and said force varying means comprising means for varying the magnitude of said fluid pressure directly with the speed of said machine.

5. Heat sealing apparatus according to claim 4 further comprising,
 means for pivoting said lever away from said back-up surface,
 and means for operating said pivoting means when said machine stops.

6. Apparatus for making parallel seals on a continuously moving film comprising,
 a large sealing wheel having two parallel sealing rims,
 a pair of small resilient rollers engaging said rims at one side of said wheel,
 a pair of small resilient rollers engaging said rim at the other side of said wheel,
 said film being fed between said wheel and said rollers, and
 means for equalizing the pressure of said rims on said rollers including
  an axle for the upstream rollers,
  an axle for the downstream rollers, and
  means for mounting said axles to permit them to tilt relative to each other.

7. Apparatus for making a seal on a continuously moving film comprising,
 a large sealing wheel and means for heating said wheel,
 a small resilient roller adjacent said sealing wheel,
 said film passing between said wheel and roller, and
 means for varying the pressure of said wheel on said film directly with the speed of said film.

8. Apparatus for making a seal on a continuously moving film comprising,
 a large sealing wheel and means for heating said wheel,
 two resilient rollers located adjacent said wheel cradling said wheel on them,
 said rollers being spaced apart to provide an arc of film passing under and in contact with that portion of the sealing wheel extending between said rollers,
 means for lifting said wheel away from said film,
 means for pressing said wheel against said film,
 means for operating said lifting means when said film will be stopped after travel less than half the distance between said rollers, and
 means for operating said pressing means to apply full pressure contact of said wheel on said film after said film has moved, from a stopped condition, less than half the distance between said rollers.

References Cited
UNITED STATES PATENTS

| | | | |
|---|---|---|---|
| 3,484,325 | 12/1969 | Pendleton | 156—583 X |
| 2,327,468 | 8/1943 | Stocker | 156—251 X |
| 2,579,063 | 12/1951 | Andrews | 156—583 |
| 2,511,703 | 6/1950 | Ettl | 156—555 X |
| 3,068,933 | 12/1962 | Klar | 156—582 X |
| 3,545,165 | 12/1970 | Greenwell | 53—26 |

BENJAMIN A. BORCHELT, Primary Examiner

J. M. HANLEY, Assistant Examiner

U.S. Cl. X.R.

156—251, 515, 583